US006875373B2

(12) United States Patent
Elendu

(10) Patent No.: US 6,875,373 B2
(45) Date of Patent: Apr. 5, 2005

(54) COMPOSITION FOR USE IN THE TESTING OF SMOKE DETECTORS

(75) Inventor: Chinwe Elendu, Ashford (GB)

(73) Assignee: No-Climb Products Ltd., Hertfordshire (GB)

( * ) Notice: Subject to any disclaimer, the term of this patent is extended or adjusted under 35 U.S.C. 154(b) by 305 days.

(21) Appl. No.: 10/098,039

(22) Filed: Mar. 14, 2002

(65) Prior Publication Data

US 2002/0156166 A1 Oct. 24, 2002

(30) Foreign Application Priority Data

Mar. 16, 2001 (GB) ............................................. 0106627

(51) Int. Cl.$^{7}$ ......................... G01N 31/00; G01N 33/00

(52) U.S. Cl. .................................................... 252/408.1

(58) Field of Search ................................ 524/379, 383; 528/425

(56) References Cited

U.S. PATENT DOCUMENTS

| | | | | | |
|---|---|---|---|---|---|
| 3,693,401 | A | * | 9/1972 | Purt et al. | 73/1 R |
| 4,715,985 | A | | 12/1987 | Pean et al. | 252/305 |
| 5,076,966 | A | | 12/1991 | Marone | 252/408.1 |
| 5,139,699 | A | * | 8/1992 | Cooper et al. | 252/305 |
| 5,225,183 | A | * | 7/1993 | Purewal et al. | 424/45 |
| 5,309,148 | A | * | 5/1994 | Birk | 340/628 |
| 5,361,623 | A | * | 11/1994 | Wantz | 73/1.05 |
| 5,468,725 | A | * | 11/1995 | Guenin et al. | 512/2 |
| 5,785,891 | A | | 7/1998 | Lim | 252/305 |
| 5,989,531 | A | * | 11/1999 | Schamper et al. | 424/65 |
| 6,001,341 | A | * | 12/1999 | Genova et al. | 424/76.1 |

FOREIGN PATENT DOCUMENTS

| | | |
|---|---|---|
| GB | 1527003 | 10/1978 |
| GB | 2243780 A | 11/1991 |
| GB | 2283978 A | 5/1995 |
| GB | 2305917 A | 4/1997 |
| WO | WO 92/00240 A1 | 1/1992 |

OTHER PUBLICATIONS

Search Report for Patent Application No.: GB 0106627.3.

* cited by examiner

*Primary Examiner*—David W. Wu
*Assistant Examiner*—Rip A. Lee
(74) *Attorney, Agent, or Firm*—Konneker & Smith P.C.

(57) ABSTRACT

A composition for use in testing smoke detectors, comprises a polyhydroxy alcohol and a surface-active agent.

11 Claims, 4 Drawing Sheets

Fig. 1 Apollo Ion Detector Hand Sprayed from 30 cm
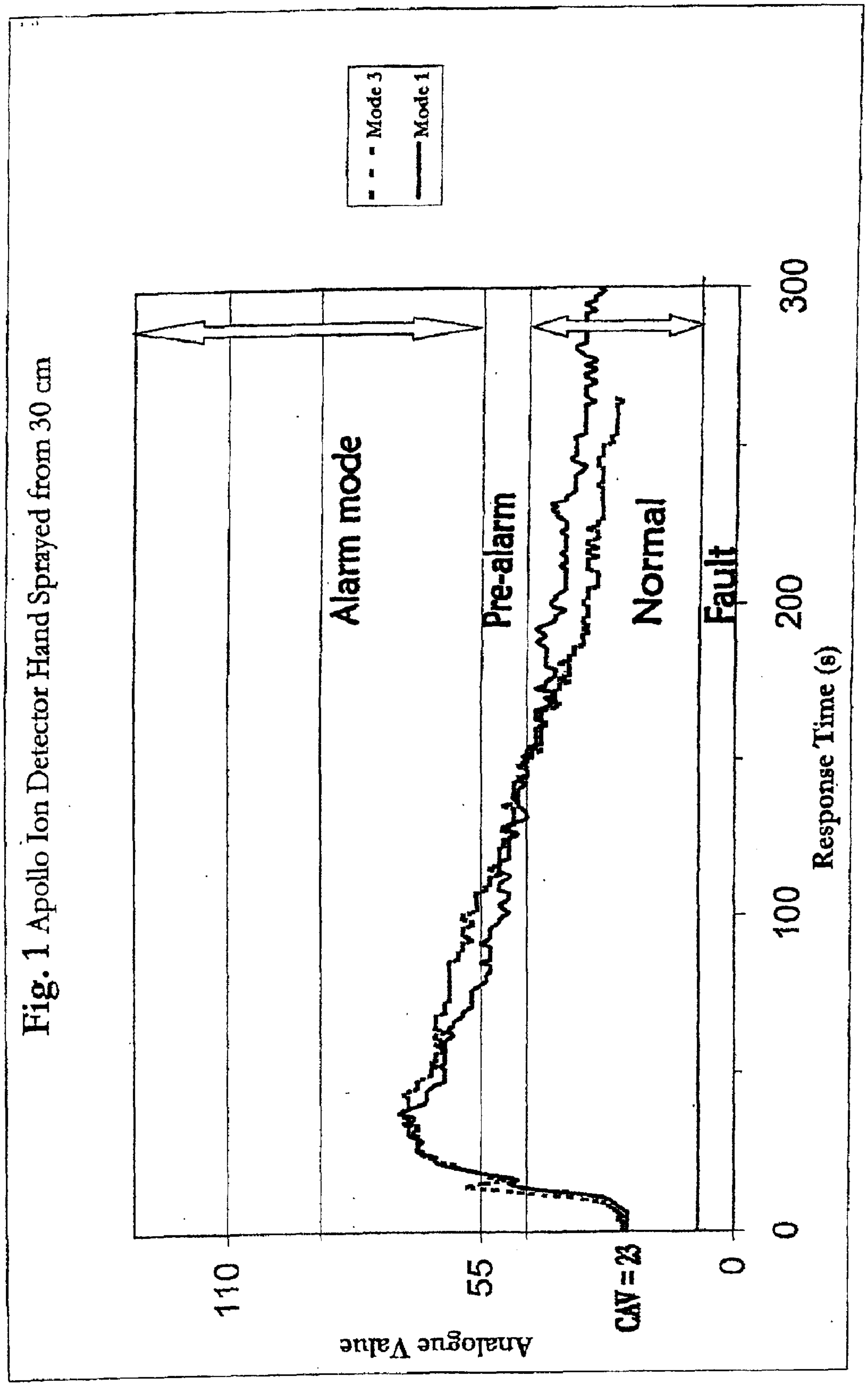

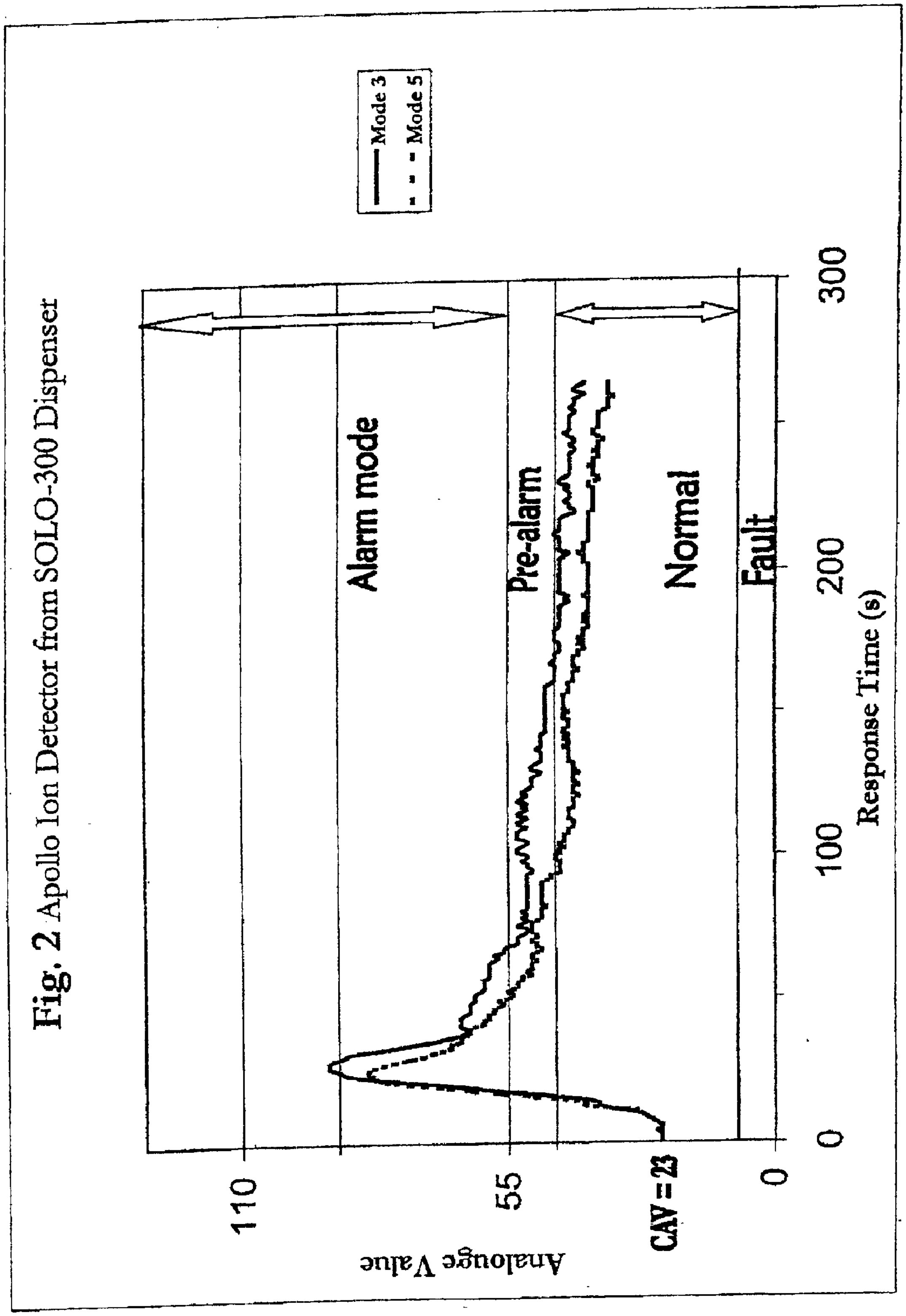
Fig. 2 Apollo Ion Detector from SOLO-300 Dispenser

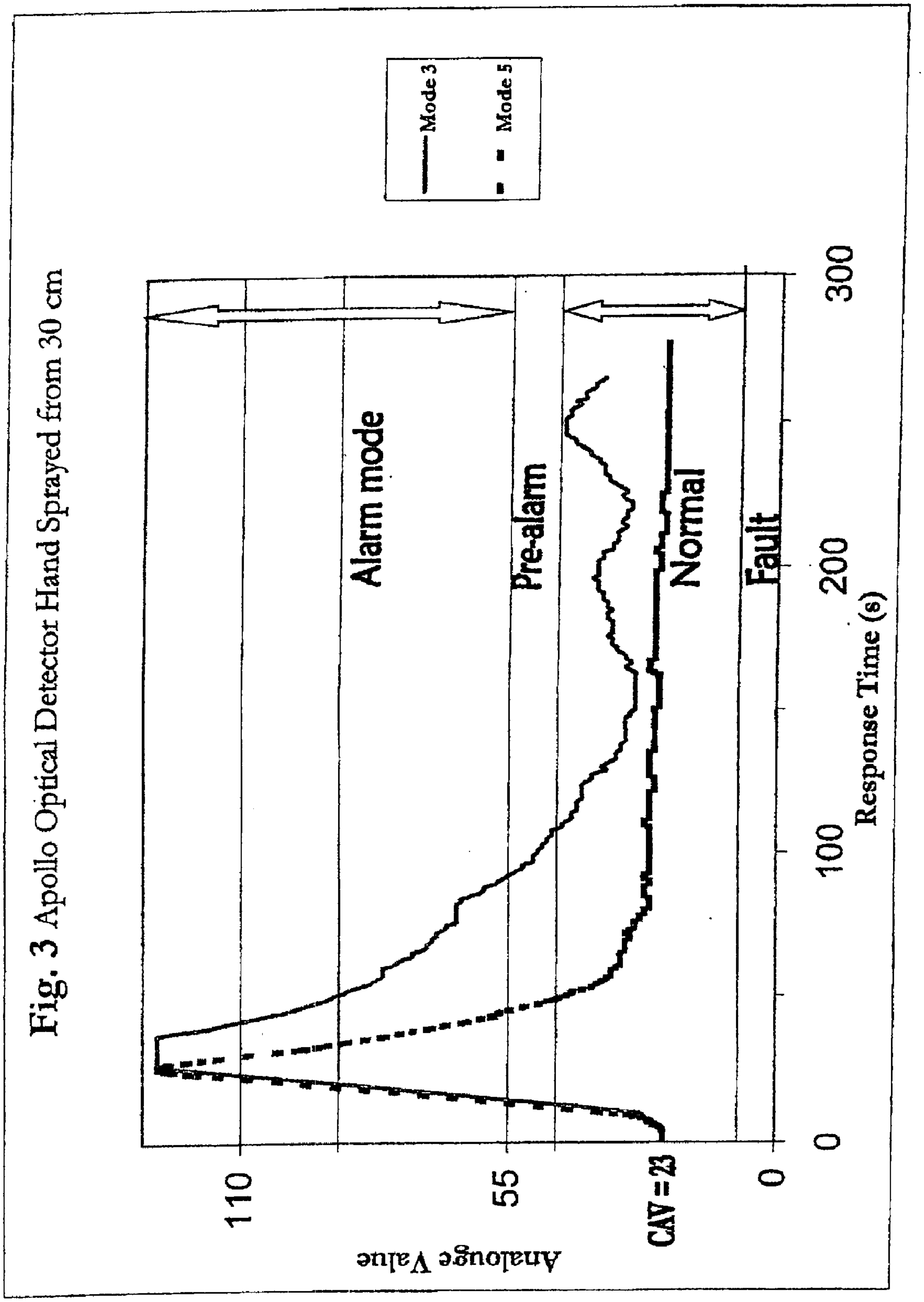
Fig. 3 Apollo Optical Detector Hand Sprayed from 30 cm

Fig. 4 Apollo Optical Detector from SOLO-300 Dispenser
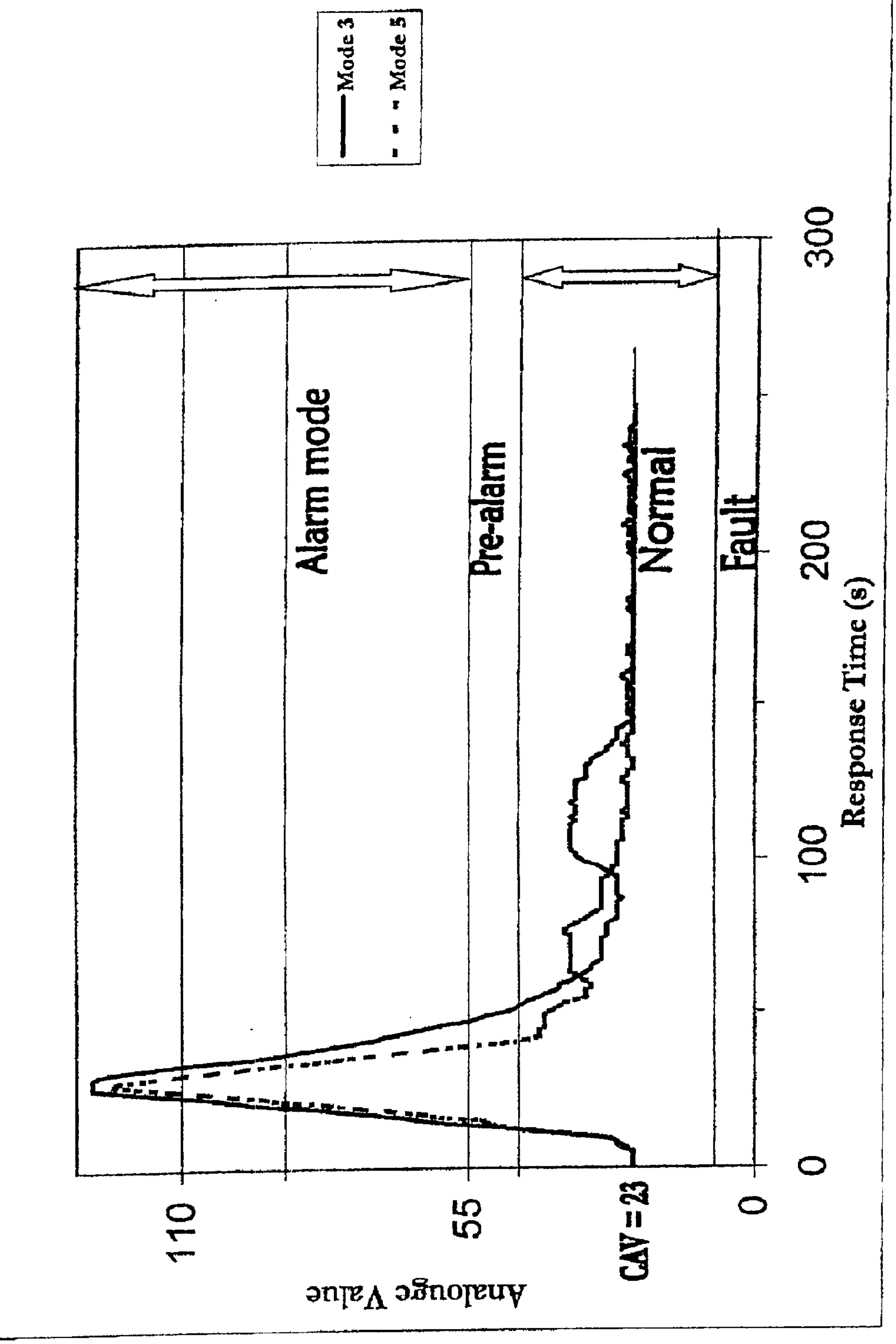

COMPOSITION FOR USE IN THE TESTING OF SMOKE DETECTORS

CROSS-REFERENCE TO RELATED APPLICATION

This application claims the benefit of the filing date under 35 USC §119 of prior U.K. patent application no. 0106627.3, filed Mar. 16, 2001, the disclosure of which is incorporated herein by this reference.

BACKGROUND

This invention relates to a composition for use in the testing of smoke detectors. More particularly it relates to a composition for the testing of both ionisation and optical smoke detectors. The invention also relates to the use of a composition for such a purpose.

Smoke detectors are a common means of safeguarding lives and property against fire and smoke damage, in both commercial and private premises. Smoke detectors respond to smoke particles or aerosols resulting from combustion and sound an alarm in response to their presence in the atmosphere. A rapid and reliable response by such detectors is vital, due to the dangers of smoke inhalation, and the speed of propagation of fires.

Smoke detectors currently operate by one of two methods, namely ionisation or photoelectric principles. The operation of ionisation smoke detectors is based on the principle of change in conductivity of the atmosphere within the measurement chamber of the smoke detector. The chamber contains two electrodes, which create an electric field across the chamber, and a very small source of a radioactive material, typically 0.2 g of americium-241. The radioactive material ionises the air particles, creating positive and negative ions inside the chamber. The movement of these ions towards the oppositely charged electrode causes an electrical current to flow within the chamber. The current strength depends on the number and velocity of the ions, and will remain relatively constant in air. When large, highly ionised smoke particles enter the measurement chamber, they are attracted to oppositely charged ions, creating ion-particle pairs of high mass. Ions in such ion-particle pairs are unable to move within the chamber as freely as isolated ions, and the reduction of the electrical current across the chamber triggers the alarm. Ionisation detectors are generally suited to smoke aerosols from flaming fires whose diameters range from 0.01–0.05 $\mu$m. They are also affected by the electrical properties of smoke, in particular, the mobility of the ion-particle pairs formed within the chamber.

Photoelectric or optical smoke detectors detect the presence of smoke particles due to their light scattering effects within the chamber. In one design, the chamber of the optical smoke detector contains an infrared light and a photodiode. Within the chamber, pulses of infrared light are emitted which, in the absence of smoke particles, do not reach the photodiode. In the presence of smoke, however, infrared light is reflected by the particles onto the photodiode, which subsequently relays the signal to an alarm unit, triggering an alarm. Photoelectric detectors are most responsive to smoke aerosols from smouldering sources, which exhibit particle diameters in the range of 0.1–5 $\mu$m. In addition to particle size, another important factor in the effectiveness of photoelectric detectors is the refractive index of the smoke particles. Refractive index dictates the amount of scattering, reflecting and absorbing of light radiation required to trigger the alarm.

Typically, smoke detectors are provided with an integral test mechanism, which may be actuated by depressing a button on the housing of the detector or a similar means. Such testing mechanisms, however, only test the alarm mechanism, and provide no information about the status of the test chamber and smoke detection means. Over time, the accumulation of interferants such as dust, dirt, grease, condensation and so on, and the ageing of the device, will affect the sensitivity of the smoke detection means, whilst not necessarily having any effect on the alarm mechanism. In ionisation detectors, the interferants will shield the radioactive source, disrupting ionic current within the chamber, whilst in photoelectric detectors a film of interferants will form over the infrared source and photodiode sensors, reducing the sensitivity of the device. Consequently the integral test mechanism is insufficient to provide an accurate view of the status of the smoke detector.

Methods are known in the art of functionally testing a smoke detector, using specific chemical compositions and methods of delivery. For example, U.S. Pat. No. 3,729,979 discloses an apparatus for generating and metering combustion products, which burns combustible material such as cigarettes or cigars, for the testing of smoke detectors, and to allow the optimum positioning of smoke detectors. Blowing smoke at detectors, however, is primitive, unpleasant and can be dangerous.

U.S. Pat. No. 3,693,401 discloses an apparatus for checking the operation of smoke detectors, comprising a housing member adapted to be placed over a smoke detector, an internal space for the generation of an aerosol therein, and a container, containing a liquefied carrier medium, such as a fully halogenated hydrocarbon, for example dichlorotetrafluoroethane. The carrier medium has a boiling point of −20° C. to +20° C., which is sufficiently high to ensure that it remains in aerosol form for long enough to actuate optical smoke detectors as well as ionisation detectors, before it evaporates. U.S. Pat. No. 4,301,674 discloses a hand-held pressurised container, to allow for direct spraying of a composition, in the form of an aerosol, which simulates products of combustion. The composition is preferably approximately 70% hydrocarbon propellant, 5% isopropyl alcohol, and 25% dioctyl phthalate. WO 92/00240 also describes the use of an aerosol spray formulation comprising a linear alkyl phthalate ester and propellant, for testing smoke detectors. U.S. Pat. No. 4,715,985 describes a composition for checking the functioning of fire detection installations, comprising triflourotrichloroethane, nitrous oxide, ethyl ether, and an alkyl phthalate. Furthermore, the use of phthalates is described in GB patent no. 1527003.

The use of HCFCs and CFCs is now banned, however, due to their adverse environmental effects. Also the use of phthalates has disadvantages, in that they are highly toxic in a respirable form, and have undesirable effects on plastics, particularly styrenes, which are commonly used in household goods.

These problems have been partially overcome by a method disclosed in U.S. Pat. No. 5,076,966, which involves a method for checking the functioning of ionisation or optical smoke detectors comprising the steps of introducing into the vicinity of the detector a polyhydroxy alcohol and a water-soluble alcohol having a boiling point of below 100° C. Such compositions are not very effective at activating ionisation detectors unless the polyhydroxy alcohol is at a high concentration. At high concentrations, however, this method will lead to the deposition of a residue in and around the smoke detector, which is unsightly and can lead to diminished sensitivity of the detector.

Furthermore, others have replaced phthalates with silicon-based compositions, such as phenyltrimethicone, (U.S. Pat. No. 5,785,891) and siloxanes (GB 2305917) with some success, although a residue may still remain after application. Silicones and siloxanes are also a possible respiratory hazard; thermal decomposition of some will produce formaldehyde, and their use limits the application of the smoke detector compositions. JP H10-079090 describes a composition for testing a smoke detector comprising an alcohol and an additive, such as a carbonate or a polyalkylene glycol.

GB 2283978 describes a composition comprising a siloxane oxyalkane surfactant and a polyol, as the reaction products for a closed cell rigid foam. GB 2243780 describes a composition comprising a silicone surfactant and optionally an alkane diol, for use as a sunscreen.

Smoke detector manufacturers have shown that, to some extent, improving the structural and response design of an ionisation chamber can reduce the tendency to false alarms caused by interferants, but such design improvements may not have a significant effect during the functional testing of smoke detectors where test products are often applied directly into the chamber through the vents.

It is accordingly an object of the present invention to provide a composition applicable with an aerosol device, capable of triggering both optical and ionisation type smoke detectors, whilst avoiding the problems associated with the prior art.

The present invention relates to a chemical composition, which forms aerosol particles of similar size, and molecular ions of similar weight and ionisation energy, in comparison to smoke aerosols. Due to the aerosol particle size, and the weight and ionisation energy of the molecular ions, the composition is able to trigger ionisation smoke detectors, whilst the aerosol also has the correct particle size and refractive index to trigger optical detectors. The composition is compatible with a wide range of plastics, as well as being inert to the user and to the environment, and enables the detector to be tested functionally, without leaving untoward residues on detector surfaces or other surfaces near the area of application.

According to one aspect of the invention, there is provided a composition for the activation of smoke detectors, which comprises a polyhydroxy alcohol and a surface-active agent.

The polyhydroxy alcohol is an efficient photoelectric detector activator, which is harmless to health and the environment and is non-aggressive to materials. The polyhydroxy alcohol may be present in concentrations of 0.05–10% w/w. In addition, the polyhydroxy alcohol preferably has a refractive index of between 1.45 and 1.5. Preferably the polyhydroxy alcohol is 1,2-ethanediol, 1,2-propanediol, 1,3-propanediol or 1,2,3-propanetriol, or mixtures thereof. The presently preferred formulation consists of 1,2,3-propanetriol (glycerol), desirably in quantities of 0.3% wt/wt and whose refractive index is 1.4746.

Surface-active agents, generally known for their emulsification characteristics, are used in the present invention for their ability to (1) impart to particles adequate electrical potential, and (2) adsorb quickly around dispersed particles, forming a non-adherent film which prevents coalescence between particles, thus maintaining correct particle sizes for longer. This makes them good activators of ionisation detectors. In addition, they generally exhibit high refractive indices, which makes them good activators of photoelectric detectors. According to the hydrophilic-lipophilic balance (HLB) system, surface-active agents are assigned a numerical value to indicate the polarity of the molecules in an arbitrary range of 1–40. High HLB values represent high polarity of the molecules. The surface-active agent may be selected from the anionic and non-ionic surfactant classes. The anionic class may consist of linear sodium alkyl

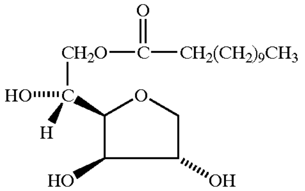

benzene sulphates, linear alkyl sulphates and linear alkyl ethoxy sulphates. The non-ionic class may include the alkyl ethoxylates, ethoxylated alkyl phenols, fatty acid esters, long chain carboxylic acid esters and polymers of ethylene oxide, propylene oxide and alcohols or mixtures thereof. The surface-active agent may be present in a concentration of between 0.05–10% wt/wt and may have an HLB value in the range of 1–40 with a refractive index between 1.45 and 1.5, and have good polarity characteristics. The presently preferred formulation consists of a sorbitan monolaurate (see above), a sorbitan ester having moderate polarity characteristics, an HLB of 8.6, refractive index of 1.4740 and preferably present in quantities of 0.2% wt/wt. It is commonly used in the pharmaceutical, food and cosmetic industries and is therefore safe to use.

Preferably, the acid moiety of the ester is a saturated long chain carboxylic acid, wherein the backbone of the carboxylic acid comprises preferably 5 to 20 carbon atoms.

According to another aspect of the invention, a composition for use in testing smoke detectors is provided, comprising a polyhydroxy alcohol and a surface-active agent, wherein the polyhydroxy alcohol and surface-active agent each has a refractive index of 1.45–1.5.

According to another aspect of the invention, a composition for use in testing smoke detectors is provided, comprising a polyhydroxy alcohol, a surface-active agent selected from the group consisting of: alkyl ethoxylates, ethoxylated alkyl phenols, fatty acid esters, long chain carboxylic acid esters, polymers of ethylene oxide, polymers of propylene oxide, polymers of alcohols or copolymers thereof, and mixtures thereof; or linear sodium alkyl benzene sulphates; linear alkyl sulphates; linear alkyl ethoxy sulphates; and mixtures thereof.

The composition preferably includes a carrier medium. The carrier medium is preferably a low boiling point alcohol or mixture of alcohols; the boiling point is preferably below 100° C. Preferably the carrier medium is selected from methanol, ethanol, 1-propanol, 2-propanol, and 2-methyl-2-propanol, or suitable combinations thereof. Most preferably the carrier medium is ethanol or 2-propanol. In a preferred embodiment, the carrier medium comprises from 5% wt/wt up to 30% wt/wt of the composition.

The composition preferably includes a propellant, in order to make it suitable for use as an aerosol. The composition may contain from 10% wt/wt up to 90% wt/wt of the propellant. It is preferably a hydrocarbon propellant (such as isobutane, propane and butane), HFC 134a, DME (dimethylether), or suitable combinations thereof.

According to another aspect of the invention, a composition for use in testing smoke detectors is provided, comprising 0.05–10% wt/wt polyhydroxy alcohol 0.05–10% w/wt surface active agent, 5–30% wt/wt carrier and 10–90% propellant.

The composition according to the invention is capable of activating both ionisation and photoelectric smoke detectors, and can therefore be used in the testing of such smoke detectors.

The composition according to the invention may be contained in dispensing equipment, capable of releasing said composition through a valve and actuator orifice to create an aerosol of substantially constant particle size, conducive to the activation of optical and ionisation smoke detectors. The composition is preferably contained within the dispensing device within a pressure range of 6–12 bar (600–1200 kPa). The preferred dispensing equipment is No Climb's "SOLO" dispensing equipment, which is designed to contain the released aerosols within the immediate vicinity of the detector until the detector alarm has activated. This feature not only prevents direct introduction of the aerosolised components into the chamber, which can cause fouling, but also provides controlled test conditions for the detectors under test. By using a housing or cup membrane placed over the smoke detector, conditions can be kept constant, and escape of the aerosol is minimised.

When the surface-active agent and polyhydroxy alcohol are applied with an appropriate amount of the carrier medium, such as an alcohol, through optimum valve/actuator specifications, residual deposits are kept to a minimum.

According to another aspect of the invention, a composition for use in testing smoke detectors is provided, comprising 0.05–10% wt/wt polyhydroxy alcohol 0.05–10% wt/wt surface active agent, 10–30% wt/wt carrier and 10–90% propellant.

According to another aspect of the invention, there is provided an aerosol device comprising a housing containing a composition as described above, and means to dispense said composition from the housing in an aerosol form. The aerosol device may contain the composition within the device at a preferred vapour pressure of approximately 6–12 bar (600 kPa–1200 kPa). In a preferred embodiment, the dispensing means comprises a valve and an actuator orifice for dispensing aerosol particles of sizes conducive to photoelectric and ionisation smoke detector response.

According to another aspect of the invention, a method of testing a smoke detector is provided, comprising contacting the smoke detector with a composition comprising a surface-active agent. Advantageously, the surface-active agent is used in combination with a polyhydroxy alcohol. The composition will usually be contacted with the smoke detector by spraying. The method may further comprise the step of detecting whether the smoke detector alarm has been activated by the step of contacting the smoke detector with the composition. This step may involve, for example, assessing whether an audible alarm has sounded, whether a visible signal has been activated or measuring the analogue value of the alarm sensor and assessing whether it exceeds the alarm mode trigger value. This step may also comprise assessing the amount of composition brought into contact with the smoke detector. Usually, the length of time the composition is in contact with the smoke detector, and the amount of the composition present in the smoke detector chamber will enable the tester to assess the sensitivity and functioning of the smoke detector. For example, an alarm that is activated by a small amount of the composition (e.g. a short 1–10 second spray application in the case of the composition being applied by aerosol), and within a few seconds (e.g. less than 30), will be indicative of a correctly functioning alarm. If a more prolonged contacting/application step is necessary, or the alarm takes some time (e.g. over 30 seconds) to activate, this is indicative of a lower sensitivity or poorly functioning alarm.

According to another aspect of the invention, a method of testing a smoke detector is provided, comprising contacting the smoke detector with a composition comprising: a polyhydroxy alcohol and a surface-active agent, wherein the surface-active agent has a refractive index from 1.45 and 1.5.

According to another aspect of the invention, a method of testing a smoke detector is provided, comprising contacting the smoke detector with a composition comprising: a polyhydroxy alcohol and a surface-active agent, wherein the surface-active agent is a polar non-ionic surfactant with an HLB of 1–10.

Various compositions, comprising polyhydroxy alcohol at concentrations of 0.1%–10% wt/wt dissolved in an alcohol, such as isopropyl alcohol, were assessed for their effectiveness in activating smoke detectors and residues deposited. At all concentrations, such compositions were found to be efficient in the activation of photoelectric smoke detectors, but poor in the activation of ionisation detectors, particularly at low wt/wt % values. At high concentrations of polyhydroxy alcohol, activation of ionisation detectors was more effective, however the presence of undesirable residues was more noticeable.

Similarly, various compositions, comprising sorbitan ester at concentrations of 0.1%–10% wt/wt dissolved in an alcohol, such as isopropyl alcohol, were assessed for their effectiveness. At all concentrations, such compositions were found to be very effective in the activation of photoelectric detectors, with lower concentrations being more conducive to fast detector recovery rates and low levels of residues. The ionisation detector response was more moderate, but still effective.

Combining the two activities at desired levels in an alcohol such as isopropyl alcohol produced a more superior response in photoelectric and, in particular, in ionisation detectors. The most favourable responses were produced when a dispenser was used to introduce the composition into the vicinity of the detector.

Various aerosol compositions consisting of glycerol at 0.2%, 0.3%, 0.4%, 0.5% and 1% wt/wt dissolved in isopropanol respectively and propelled by HFC 134a were prepared and tested using the Apollo Discovery™ range (Apollo Fire Detectors Ltd) of ionisation and photoelectric smoke detectors. These high-specification analogue addressable fire detectors can operate in one of five response modes, which are related to their sensitivity. Mode 1 will provide a higher sensitivity to fires than mode 5, i.e. a detector in mode 1 can be more easily activated than one in mode 5.

Tests revealed that with glycerol levels at 0.5% or 1% wt/wt, only ionisation detectors in mode 1 (the most sensitive response mode) could be successfully activated by the aerosol. Levels of glycerol at above 1% wt/wt produced residual deposits on the detector surface.

For photoelectric detectors, all response modes were successfully activated in adequate time (loss than 30 seconds). This confirmed glycerol as an effective photoelectric detector activator. These results were substantiated by observing the differences in the level of activity within the chambers through graphical profile output, which showed that higher levels of activity were reached in the optical detectors.

Similarly, equivalent levels of sorbitan monolaurate were dissolved in isopropanol and duly tested. All response modes in both types of detector responded within 30 seconds. Again, levels above 1% wt/wt produced noticeable residual deposits on the detector surface. This confirmed sorbitan monolaurate as an effective ionisation and photoelectric smoke detector activator.

The invention is further frustrated with reference to the following figures.

FIG. 1 is a graph showing the analogue value produced by the application of the preferred formulation, hand-sprayed from 30 cm at an Apollo Ion detector.

FIG. 2 is a graph showing the analogue value produced by the application of the preferred formulation, sprayed by dispenser at an Apollo Ion Detector.

FIG. 3 is a graph showing the analogue value produced by the application of the preferred formulation, hand-sprayed from 30 cm at an Apollo Optical detector.

FIG. 4 is a graph showing the analogue value produced by the application of the preferred formulation, sprayed by dispenser at an Apollo Optical Detector.

Quantitative tests were carried out by measuring the analogue value of the detector over time. To test the effectiveness of the compositions, the analogue value of the two types of detectors was measured during application of the preferred formulation from a distance of 30 cm. When smoke is introduced into a detector, the analogue value rises to a maximum value of 127, before falling when clean air replaces the smoke in the chamber, to the clean air value (CAV) of 23.

FIG. 1 shows that even when hand spraying, a reasonable response was achieved in the ionisation detector, at mode 1 or mode 3 detector levels. As shown in FIG. 2, however, activity peaks a lot higher in the ionisation detector, and the response is more rapid, when a dispenser is used, rather than testing by hand. The alarm is triggered, even when the ionisation detector is set to mode 5. Importantly, the recovery time (time taken for the detector to return to quiescent conditions) of the alarm is more rapid when the formulation is applied with a dispenser.

FIGS. 3 and 4 shows that the even more effective results are achieved in optical sensors, using the preferred composition. When sprayed by hand, the analogue value reaches the maximum value, even with the detector in mode 5. Similarly, when a dispenser is used, the analogue value reaches its maximum, however, the detector recovery time is considerably faster than when the composition is hand sprayed, particularly when the detector is in a more sensitive mode.

What is claimed is:

1. A composition for use in testing smoke detectors, comprising a propellant, a polyhydroxy alcohol and a surface-active agent, wherein the polyhydroxy alcohol and surface-active agent each has a refractive index of 1.45–1.5.

2. A composition according to claim 1, wherein the polyhydroxy alcohol is selected from the group consisting of 1,2-ethanediol; 1,2-propanediol; 1,3-propanediol; 1,2,3-propanetriol; and mixtures thereof.

3. A composition according to claim 1, wherein the polyhydroxy alcohol is 1,2,3-propanetriol.

4. A composition according to claim 1, wherein the surface-active agent is a polar, non-ionic surface-active agent.

5. A composition according to claim 1, wherein the surface-active agent has an HLB of 1–10.

6. A composition according to claim 1, wherein the surface-active agent comprises at least one selected from the group consisting of alkyl ethoxylates; ethoxylated alkyl phenols; fatty acid esters; long chain carboxylic acid esters; polymers of ethylene oxide, polymers of propylene oxide, polymers of alcohols, copolymers of said polymers; linear sodium alkyl benzene sulphates; linear alkyl sulphates; and linear alkyl ethoxy sulphates.

7. A composition according to claim 1, wherein the surface-active agent is a sorbitan ester.

8. A composition according to claim 1, wherein the surface-active agent is sorbitan monolaurate.

9. A composition according to claim 1, further comprising a carrier medium.

10. A composition for use in testing smoke detectors, comprising 0.05–10% wt/wt polyhydroxy alcohol 0.05–10% wt/wt surface active agent, 5–30% wt/wt carrier and 10–90% propellant.

11. A composition for use in testing smoke detectors, comprising a propellant, a polyhydroxy alcohol, a surface-active agent comprising at least one selected from the group consisting of alkyl ethoxylates, ethoxylated alkyl phenols, fatty acid esters, long chain carboxylic acid esters, polymers of ethylene oxide, polymers of propylene oxide, polymers of alcohols, copolymers of said polymers, linear sodium alkyl benzene sulphates; linear alkyl sulphates; and linear alkyl ethoxy sulphates.

* * * * *